United States Patent [19]

Keast et al.

[11] 4,296,842

[45] Oct. 27, 1981

[54] PAWL AND RATCHET MECHANISM

[75] Inventors: Larry G. Keast, Houston, Tex.; Herbert D. Horton, Mayhill, N. Mex.

[73] Assignee: World Wide Oil Tools, Inc., Houston, Tex.

[21] Appl. No.: 83,162

[22] Filed: Oct. 9, 1979

[51] Int. Cl.³ .............................................. F16D 63/00
[52] U.S. Cl. .................................. 188/61; 188/196 B; 188/382
[58] Field of Search ................... 188/61, 60, 31, 38.5, 188/30, 127, 82.7, 82.74, 82.77, 82.9, 1 R, 196 B, 196 P, 197, 198; 74/575, 577 R, 578, 577 M

[56] References Cited

U.S. PATENT DOCUMENTS

| | | | |
|---|---|---|---|
| 2,719,613 | 10/1955 | Spann et al. | 188/196 B |
| 2,747,700 | 5/1956 | Daly | 188/196 B |
| 3,119,470 | 1/1964 | Rauglas | 188/196 B X |

*Primary Examiner*—Douglas C. Butler
*Attorney, Agent, or Firm*—Vinson & Elkins

[57] ABSTRACT

An improved pawl and ratchet mechanism is disclosed wherein at least one of a plurality of pawl elements movably disposed within a housing is movable into at least one of the spaces between the teeth of a toothed track ratchet irrespective of the location of the housing with respect to the toothed track ratchet when the housing engages the toothed track ratchet. The improved pawl and ratchet mechanism may be used to contain explosive forces resulting from a pressure failure during the hydraulic testing of pipe.

12 Claims, 6 Drawing Figures

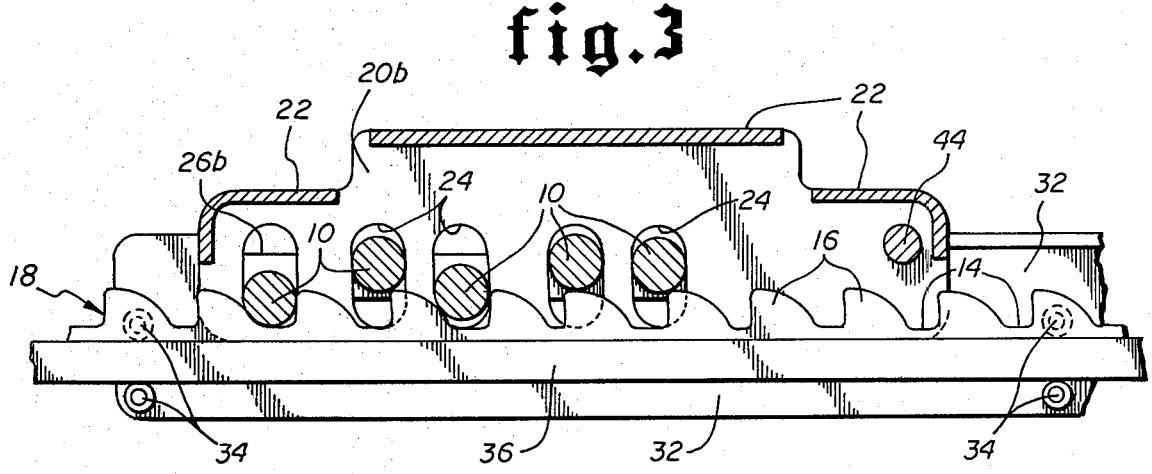
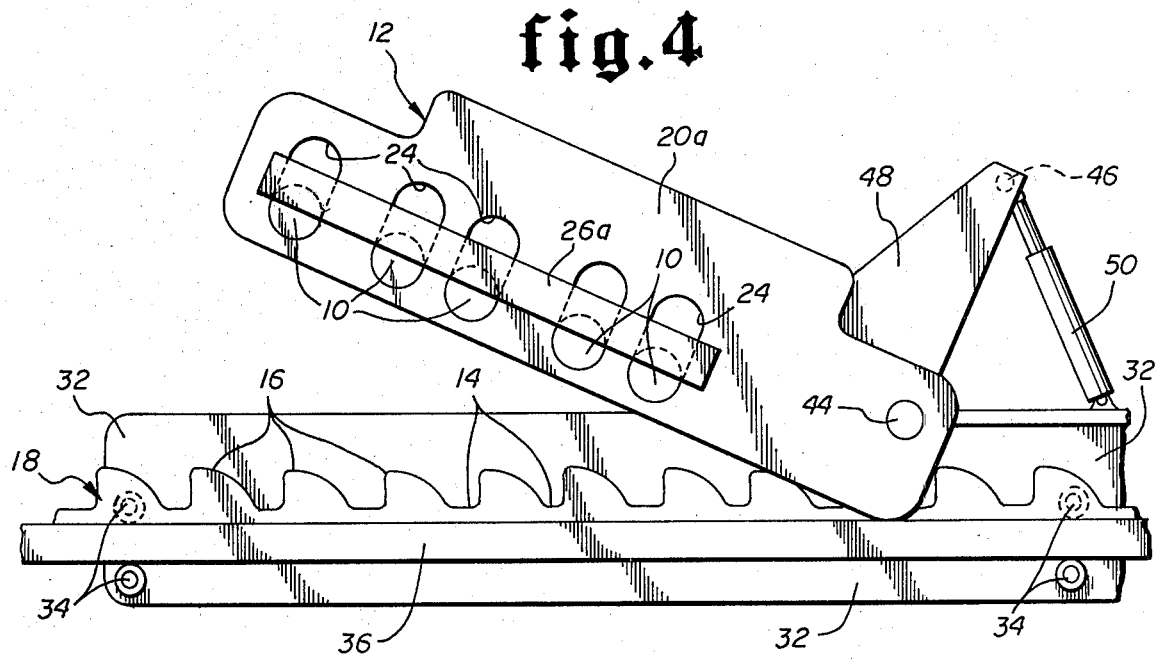

PAWL AND RATCHET MECHANISM

BACKGROUND OF THE INVENTION

The present invention relates to an improvement in the latching of one or more pawls within a pawl and ratchet mechanism. A pawl and ratchet mechanism with the improved latching mechanism of the present invention may be subjected to and successfully contain explosive forces. When forces of great magnitude are suddenly applied to pawl and ratchet mechanisms that exist in the prior art, such explosive forces may cause a pawl to fail to latch within the ratchet. Such failure is due to the fact that an explosive force may cause a pawl to be thrown upward out of latching engagement with the ratchet. The speed with which a disengaged pawl is thrown back by an explosive force can prevent the pawl from engaging any other portions of the ratchet.

While the improved latching mechanism of the present invention may find application in any situation in which a pawl and ratchet mechanism is employed, the application and embodiment of the present invention described herein is designed for use in hydraulic testing of tubular members such as drill pipe and casing used in the oil and gas producing industry.

Hydraulic pipe testing apparatus is well known in the prior art. Generally speaking, such apparatus comprises means for sealing the ends of a pipe to be tested and means for introducing and removing hydraulic fluid from the pipe through the apparatus used to seal the ends of the pipe. The means for sealing each pipe end usually comprises a threaded plug which is rotatably mounted on a wheeled carriage adapted to roll on tracks parallel to the length of the pipe.

In the pipe testing operation, the pipe is first placed upon and secured onto a pipe supporting stand. Two of the aforementioned wheeled carriages are rolled up to the ends of the pipe to be tested so that the rotatably mounted threaded plugs carried by the carriages are brought into alignment with the ends of the pipe. The threaded plugs are then inserted into the ends of the pipe and rotated to threadably engage and seal the ends of the pipe.

In order to prevent the movement of the carriages away from the pipe during pipe testing operations, numerous types of pipe testing apparatus in the prior art have utilized pawl and ratchet mechanisms. Such mechanisms usually involve the use of two toothed tracks aligned parallel to the direction of motion of the carriage. A pivotally movable arm or bar is usually mounted on the carriage to serve as a pawl for engaging the ratchet formed by the teeth of the toothed tracks. Once the carriage is in place and the threaded plug has sealed the end of the pipe, the pivotally movable arm or bar is mechanically or hydraulically lowered so that its non-pivoted end comes to rest in a space between the teeth of one or more of the toothed tracks, thus preventing movement of the carriage away from the pipe.

The pawl and ratchet mechanisms disclosed in the prior art are not designed to restrain a carriage which is subjected to the explosive forces observed during high pressure hydraulic failure occurring during the testing of large diameter pipe such as casing. Because the hydraulic fluid used to internally test casing must be under high pressure and because the cross-sectional area of casing is large, the explosive force with which the threaded plug is thrown from the pipe during failure may be very great. A comparison of the magnitude of the forces involved in hydraulic testing is illustrative. A typical test pressure for small two-inch (2") inner diameter tubing is about 7,000 p.s.i. This pressure applied to the circular cross-sectional area of the tubing (3.14 square inches) yields a force of approximately 22,000 lbs. acting upon the threaded connection of the threaded plug. The inner diameter of casing, however, is on the order of thirteen inches (13") and the test pressures are typically in the 3,000 p.s.i. range. Such pressure acting upon the circular cross-sectional area of the casing (133 square inches) yields a force of approximately 400,000 lbs. acting upon the threaded connection of the threaded plug. Such force can easily cause the threaded plug to be blown out of the end of the pipe if the plug has been improperly threaded into the pipe or if a structural failure of the threads of the pipe or of the threads of the plug occurs.

One approach to solving the problem of containing a plug thrown from a pipe during high pressure hydraulic testing has been to provide a large massive wall or receptacle into which the plug may be thrown without damage. The primary drawback to this approach is that it is not adaptable for use on portable pipe testing apparatus. The size and weight of a large massive retaining wall or receptacle dictates that such method is practical only for stationary pipe testing apparatus.

The present invention finds application in providing means for containing the explosive force occurring during a pressure failure of the type described wherein said means are adapted to be used with a portable pipe testing apparatus.

SUMMARY OF THE INVENTION

The present invention relates to an improved pawl and ratchet mechanism. The invention provides a plurality of pawl elements which cooperate with one or more toothed tracks which comprise the ratchet. The pawl elements of the invention are disposed so that at least one pawl element is in a seated position with respect to the ratchet whenever the pawl and ratchet mechanism is engaged.

An object of the invention is to provide an improvement in the latching of one or more pawl elements within a pawl and ratchet mechanism.

A further object is to provide a pawl and ratchet mechanism capable of successfully withstanding the sudden application of forces of great magnitude.

Another object of the invention as the invention relates to the hydraulic testing of tubular members such as oil field drill pipe and casing is to provide a method for containing the plugs explosively thrown from the end of such pipe during a high hydraulic pressure failure during the testing process.

Still another object is to provide a pawl and ratchet mechanism of such strength and weight that it may be used with portable pipe testing apparatus to contain a plug blown out of the end of a pipe during the above-described high hydraulic pressure failure.

BRIEF DESCRIPTION OF THE DRAWINGS

The aforementioned objects and other objects and advantages are hereinafter set forth and explained in the following description with reference to the drawings wherein:

FIG. 3 is a sectional side view of the housing in which the movable pawl elements are disposed with one apertured wall removed to show the vertical cooperation of the movable pawl elements with the toothed track ratchet when the housing engages the toothed track ratchet.

FIG. 4 is a side view of the housing in which the movable pawl elements are disposed showing the manner in which the housing may be pivoted out of engagement with the toothed track ratchet.

DESCRIPTION OF THE PREFERRED EMBODIMENT

Figure 1:
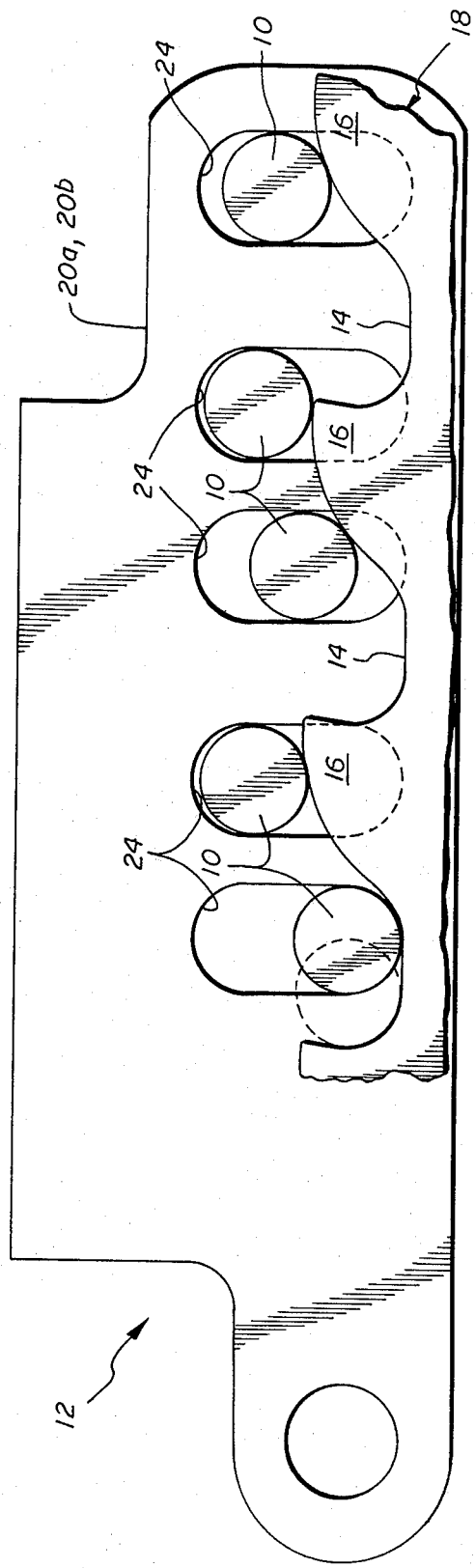
FIG. 1 is a schematic longitudinal sectional view of the shape of a toothed track ratchet of the invention and of the spacing and possible movement of the movable pawl elements which cooperate with said toothed track ratchet.

The present invention utilizes a plurality of pawl elements 10 contained and movably supported within a pawl housing 12. As will be more fully described below, the invention provides means for moving at least one of said plurality of pawl elements 10 into at least one of the spaces 14 between the teeth 16 of a toothed track ratchet 18.

In the preferred embodiment of the invention pawl housing 12 comprises two parallel apertured walls 20a, 20b each of which are fixedly connected to a pawl housing top 22 along the upper edge of each apertured wall 20a, 20b. The width of said pawl housing top 22 is such that the faces of parallel apertured walls 20a, 20b are separated from each other by a distance that is slightly greater than the width of toothed track ratchet 18. Because there is no structural connection between the two parallel apertured walls 20a, 20b along their respective bottom edges, pawl housing 12 has the general shape of a covered two-sided elongated bottomless box adapted to fit on top of and be slidably movable along toothed track ratchet 18.

Figure 2:
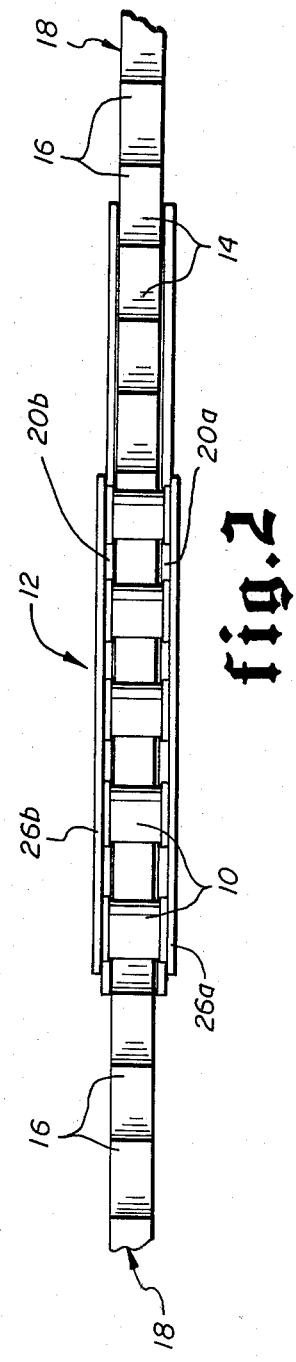
FIG. 2 is a top view of the housing in which the movable pawl elements are disposed showing the extension of the pawl elements across the toothed track ratchet.

As shown in FIGS. 1 and 2, the pawl elements 10 have the general shape of right circular cylinders. While it is possible that pawl elements of some other shape might be utilized in the invention, the circular cross-section of cylindrically shaped pawl elements provides the best result.

The pawl apertures 24 in each of the apertured walls 20a, 20b are adapted to accommodate the ends of the cylindrically shaped pawl elements 10. Specifically, each pawl aperture 24 has the form of a slot in which the width of the slot is equal to the diameter of the circular cross-sectional area of pawl element 10 and each end of the slot terminates in a semi-circle with a radius equal to one-half the width of the slot. Each pawl aperture 24 is disposed within its respective apertured wall 20a or 20b so that a straight line drawn connecting the two semi-circular ends of said pawl aperture 24 is essentially perpendicular to the length of the respective apertured wall 20a or 20b.

The pawl apertures 24 are spaced along the length of each apertured wall 20a, 20b as shown in FIG. 1. When two apertured walls 20a, 20b are formed into a pawl housing 12 as described above, the pawl apertures 24a in the first apertured wall 20a are aligned with the pawl apertures 24b in the second apertured wall 20b so that for each pawl aperture 24a in the first apertured wall 20a there is a corresponding pawl aperture 24b in the second apertured wall 20b immediately opposite said pawl aperture 24a. The fact that the apertured walls 20a, 20b are parallel insures that each pair of corresponding pawl apertures 24a, 24b is separated by a uniform distance.

The pawl elements 10 are mounted within pawl housing 12 as shown in FIGS. 1 and 2. During construction of pawl housing 12 the pawl elements 10 are simply inserted through the aligned pawl apertures 24a, 24b of the parallel apertured walls 20a, 20b. The length of the pawl elements 10 is chosen so that each pawl element 10 is long enough to bridge the distance between the parallel apertured walls 20a, 20b while having each of the two opposite ends of said pawl element 10 resting within the pawl apertures 24a, 24b of apertured walls 20a, 20b. Once the pawl elements 10 are inserted within pawl housing 12 as described, they are kept in place by pawl element retaining bars 26a, 26b fixedly attached to the outer surfaces of apertured walls 20a, 20b as shown in FIGS. 2 and 4. Said bars 26a, 26b extend along the length of said apertured walls 20a, 20b and cover a portion of each of the pawl apertures 24a, 24b so that the pawl elements 10 that have been inserted within pawl housing 12 as described may not laterally slip out of pawl housing 12. Pawl elements 10 are long enough so that any lateral movement of a pawl element 10 with respect to pawl housing 12 will be restrained by a pawl element restraining bar 26 before the opposite trailing end of said laterally moving pawl element 10 can fall out of its respective pawl aperture 24.

It is also to be noted that the height of the pawl apertures 24 must be less than the length of the pawl elements 10 to prevent the pawl elements 10 from falling out of pawl housing 12. If the length of the pawl apertures 24 were equal or greater than the length of the pawl elements 10, it is possible that the pawl elements 10 could rotate within the plane which passes through the length of a pawl element and which is substantially perpendicular to the length of the apertured walls 20a, 20b. Such rotation could cause both ends of a pawl element 10 to be disengaged from their respective pawl apertures 24 thereby causing said pawl element 10 to no longer be confined within pawl housing 12.

FIG. 1 illustrates how the pawl elements 10 may be vertically displaced within pawl housing 12 when pawl housing 12 is placed over toothed track ratchet 18. As pawl housing 12 is lowered onto said toothed track ratchet 18 the teeth 16 extend upwardly into the space between the apertured walls 20a, 20b of pawl housing 12 contacting and pushing the pawl elements 10 upwardly by different amounts. The amount by which each pawl element 10 is vertically displaced depends upon the shape of the teeth 16 of the tooth tracked ratchet 18 and upon the spacing of the pawl apertures 24 within the apertured walls 20a, 20b of pawl housing 12.

The design of the preferred embodiment of the invention contemplates that the bottom of each of the pawl apertures 24 will be aligned with the level of the spaces 14 between the teeth 16 of the toothed track ratchet 18 when pawl housing 12 is lowered onto said ratchet 18. This alignment permits the pawl members 10 that happen to be located above spaces 14 to fall into latching position within said spaces 14. The height of the pawl apertures 24 is designed so that a pawl member 10 located above the highest point of a tooth 16 may rest upon the top of said tooth 16 and still have a slight amount of room left for upward movement within its pawl aperture 24 as shown in FIG. 1.

The shape of teeth 16 of toothed track ratchet 18 is not symmetrical. As shown in FIGS. 1, 3 and 4, each tooth 16 possesses one edge which is substantially perpendicular to the length of toothed track 18. This substantially perpendicular vertical edge serves as the portion of tooth 16 against which a pawl element 10 latched into the space 14 immediately before said tooth 16 would be thrown during a reversal of the pawl and ratchet mechanism of the invention.

The shape of the other edge of each tooth 16 is that of a slightly convex curve as shown in FIG. 1. Said curved edge begins at the level of space 14 and gently curves upwardly to the top of each tooth 16. The curved edge is shaped to facilitate the rolling movement of a pawl element 10 from a space 14 to the top of a tooth 16 when pawl housing 12 is moved forward with respect to toothed track ratchet 18.

The asymmetry of the shape of teeth 16 is a standard feature of ratchet structures and is found in many prior art ratchets. The improved latching feature of the present invention lies in the use of a plurality of pawl elements 10 mounted as described and in the spacing of those pawl elements 10 within pawl housing 12 so that there is always at least one such pawl element 10 in latching position in a space 14 between the teeth 16 irrespective of the location of pawl housing 12 with respect to toothed track ratchet 18.

As seen in FIG. 1, it is possible that a pawl element 10 in latching position does not occupy the whole of a space 14. It is possible that pawl element 10 may come to rest within the forward portion of space 14 and not be directly in contact with the vertical edge of the tooth 16 immediately behind said pawl element 10. As seen in FIG. 1, however, the maximum distance that such a pawl element 10 would travel during a reversal of the pawl and ratchet mechanism before hitting the restraining vertical edge of tooth 16 is approximately equal to the length of the radius of the circular cross-sectional area of the cylindrical pawl elements 10 of the preferred embodiment of the invention. This radius is approximately equal to one inch in the existing embodiment of the invention in a hydraulic pipe testing apparatus.

While one or more of the improved latching mechanisms of the invention may be utilized to prevent the reversal of a pawl and ratchet mechanism in numerous other applications, the preferred embodiment of the invention in a hydraulic pipe testing apparatus utilizes a total of four such latching mechanisms.

Figure 5:
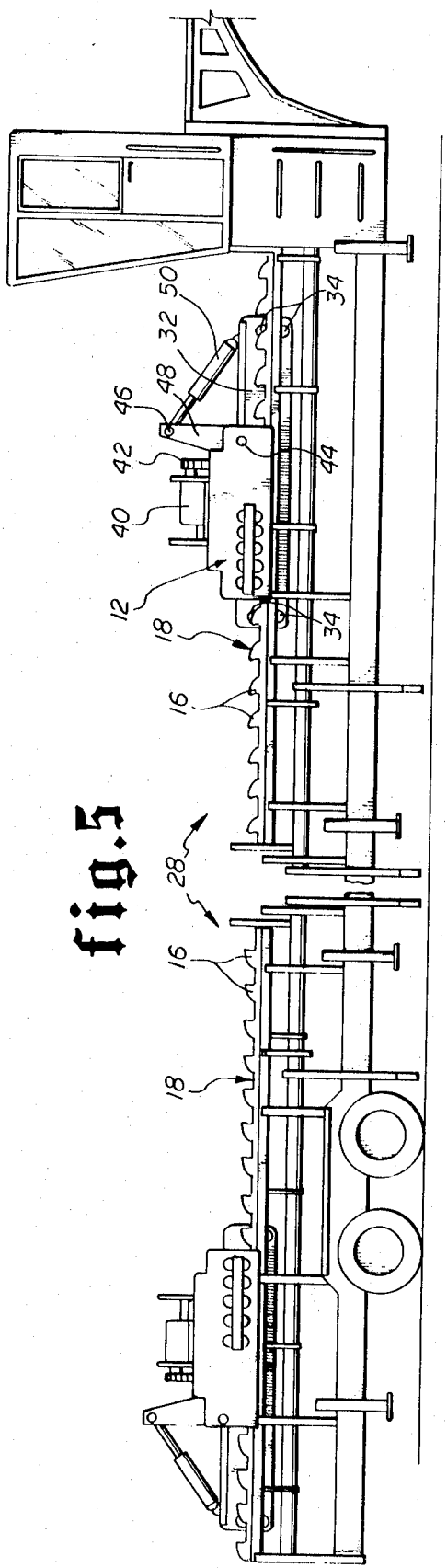
FIG. 5 is a side view of a portable pipe testing apparatus employing the improved ratchet mechanism of the invention.

FIG. 5 depicts an overall side view of said pipe testing apparatus 28. Apparatus 28 possesses four toothed track ratchets 18. Two of said toothed track ratchets 18 are mounted parallel to each other on each of the two ends of said apparatus 28 with the vertical edges of the teeth 16 facing toward the center of the apparatus 28 as shown in FIG. 5. Each toothed track ratchet 18 has associated with it a pawl housing 12 containing the improved latching mechanism of the invention. Each end of the pipe to be tested (not shown) rests between two toothed track ratchets 18 and associated pawl housings 12 when said pipe is removably fastened lengthwise onto said pipe testing apparatus 28.

Since each end of the pipe to be tested has associated with it improved pawl and ratchet mechanisms that are structurally identical and that differ only in the directionality with which they are mounted on pipe testing apparatus 28, the remaining description will be directed to the operational details of the invention only with respect to one end of the pipe. It will be understood, however, that the description herein also pertains to the equipment securing the other end of the pipe.

Figure 6:
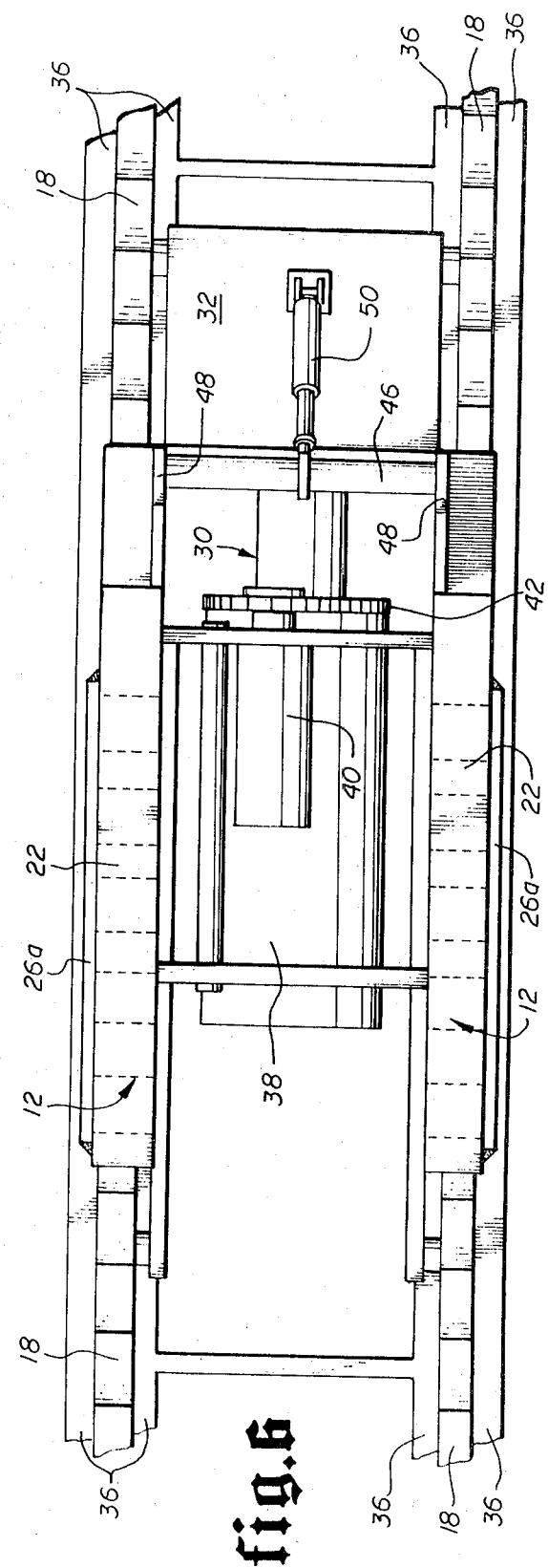
FIG. 6 is a top view of a housing for receiving the end of a pipe to be tested in a portable pipe testing apparatus and a top view of the two housings containing movable pawl elements, said view showing the structural relationships and connection between the three housings.

FIG. 6 depicts a top view of the pipe housing 30 for receiving and sealing the end of the pipe to be tested (shown in dotted outline) and its structural relationship and connection to the two pawl housings 12 associated with the two toothed track ratchets 18. Pipe housing 30 comprises a wheeled carriage 32 fitted with wheels 34 and adapted to roll on a set of parallel carriage tracks 36 and a pipe end receptacle 38 for receiving the end of the pipe to be tested. Said receptacle 38 has the general form of a hollow right circular cylinder and contains and supports within it a threaded plug (not shown) which may be rotated by motive means such as a motor 40 and endless chain 42 to threadably engage and seal the end of the pipe to be tested.

In the preferred embodiment of the invention, the toothed track ratchets 18 are fixably mounted such as by welding onto carriage tracks 36. The width of said toothed track ratchets 18 is less than the width of said carriage tracks 36 so that when said toothed track ratchets 18 are mounted along the central longitudinal axis of said carriage tracks 36 there remains exposed sufficient surface area on the outer edges of the top of said carriage tracks 36 to support the carriage wheels 34 of pipe housing 30 and to support the bottom edge of apertured walls 20a and 20b of pawl housing 12 when said pawl housing 12 is lowered into engagement with toothed track ratchet 18 as shown in FIG. 5.

While various means for engaging a pawl housing 12 with its respective toothed track ratchet 18 may be devised, the preferred embodiment of the invention contemplates an arrangement in which the pawl housings 12 are pivotally lowered and raised into and out of latching engagement with toothed track ratchets 18. As shown in FIGS. 4 and 6, each of the two pawl housings 12 may be pivotally secured to pipe housing 30 by means of pivot member 44. So that the two pawl housings 12 may be simultaneously lowered by rotation about their respective pivot members 44, said pawl housings are structurally connected by transverse bar 46 as shown in FIGS. 4 and 6. Each end of transverse bar 46 is fixedly mounted to a vertical support arm 48 fixedly mounted to the pivoted end of each pawl housing 12 as shown in FIG. 4. Vertical support arms 48 serve to increase the distance between transverse arm 46 and pivot members 44 in order to improve the leverage attainable during the application of the force required to pivotally raise pawl housings 12. Said pivoting force in the preferred embodiment of the invention is provided by a hydraulic cylinder 50 which connects transverse bar 46 and wheeled carriage 32.

During the pipe testing operation, the pipe to be tested is placed longitudinally upon pipe testing apparatus 28 and is temporarily secured to said apparatus 28 between the two pipe housings 30 so that each end of the pipe is axially aligned with pipe end receptacle 38 of pipe housing 30. Each wheeled carriage 32 is then moved toward its respective pipe end until the pipe end receptacles 38 receive and enclose the ends of the pipe. During the advancement of each wheeled carriage 32 toward its respective end of the pipe, the pawl housings 12 are pivotally raised out of engagement with toothed track ratchets 18 as described above so that the wheeled carriages 32 may travel forward without pawl elements 10 riding along the teeth 16 of the toothed track ratchets 18.

Once the threaded plugs (not shown) contained within pipe end receptacles 38 are inserted within the ends of the pipe, the pawl housings 12 are pivotally lowered into latching engagement with toothed track ratchets 18 as described above. As motor 40 causes endless chain 42 to rotate said threaded plugs thereby threadably sealing the ends of the pipe, each wheeled carriage 32 is naturally pulled toward each pipe end by the contraction caused by the making up of the threaded surfaces. During this slight forward motion of the wheeled carriages 32 the pawl members 10 rise and fall within the apertured walls 20a, 20b of pawl housing 12 as said pawl members 10 roll over the teeth 16 of the toothed track ratchets 18. When the rotational makeup of the threaded plugs to the pipe is completed at least one of the pawl members 10 is in a latched position as described above.

The pawl members 10 in the preferred embodiment of the invention are cylindrically shaped steel bars with a diameter of two inches. The apertured walls 20a, 20b of each pawl housing 12 are also constructed of steel as are the toothed track ratchets 18. Because the high pressure hydraulic fluid used in the testing process would throw a threaded plug out of the pipe with explosive force in the event of a pressure failure, the pipe end receptacles 38 are also constructed of steel to absorb and contain the force impelling an expelled threaded plug. Said force is transmitted to wheeled carriages 32, also constructed of steel, and then to the improved latching mechanism of the invention via pivot members 44. Because said pivot members 44 transmit and couple said explosive force to the pawl housings 12 and to the toothed track ratchets 18, it is very important that said pivot members 44 be constructed of heavy duty steel and be large enough to withstand the forces imposed upon them.

Not only does the structural arrangement of the improved latching mechanism of the invention provide sufficient strength to contain a high pressure hydraulic failure of the type described, it possesses such strength while also possessing such a relatively light weight that it may be used on portable pipe testing apparatus as described.

What is claimed is:

1. A pawl and ratchet mechanism comprising:
   a housing having portions defining a plurality of apertures, each aperture of said plurality of apertures disposed within said housing at a fixed distance from each of the other apertures in said plurality of apertures;
   a toothed track associated with said housing, said teeth of said track having spaces therebetween; and
   a pawl element disposed within and movable within each of said plurality of apertures within said housing, said pawl elements being movable into and out of the spaces between the teeth of said toothed track and wherein at least one of said plurality of said pawl elements is movable into at least one of the spaces between the teeth of said toothed track irrespective of the location of said housing with respect to said toothed track when said housing engages said toothed track.

2. A pawl and ratchet mechanism as in claim 1 wherein said housing has walls having apertures and wherein said pawl elements are movably mounted within said housing between said apertured walls, said pawl elements extending between said apertured walls and having ends disposed within the apertures of said apertured walls.

3. A pawl and ratchet mechanism as in claim 1 wherein at least one of said plurality of said pawl elements is movable into at least one of the spaces between the teeth of said toothed track, said pawl element being located no further from a tooth of said toothed track than the distance approximately equal to one half the cross-sectional diameter of said pawl element, irrespective of the location of said housing with respect to said toothed track when said housing engages said toothed track.

4. A pawl and ratchet mechanism as in claim 3 wherein said pawl elements comprise cylindrically shaped bars.

5. A pawl and ratchet mechanism as in claims 1, 2, 3 or 4 together with means for engaging and disengaging with respect to said toothed track said pawl elements within said housing.

6. An apparatus for containing explosive forces resulting from a pressure failure during the hydraulic testing of pipe comprising:
   a first housing for receiving the end of a pipe to be tested;
   supporting means for supporting said first housing wherein said first housing is longitudinally movable on said support means;
   at least one toothed track associated with said support means, said teeth of said toothed track having spaces therebetween; and
   at least one second housing mounted on said first housing, said second housing having portions defining a plurality of apertures, each aperture of said plurality of apertures disposed within said second housing at a fixed distance from each of the other apertures in said plurality of apertures, said second housing having disposed therein a pawl element movable within each of said plurality of apertures within said second housing, said pawl elements being movable into and out of the spaces between the teeth of said toothed track and wherein at least one of said plurality of said pawl elements is movable into at least one of the spaces between the teeth of said toothed track irrespective of the location of said second housing with respect to said toothed track when said second housing engages said toothed track.

7. An apparatus as in claim 6 wherein said second housing has walls having apertures and wherein said pawl elements are movably mounted within said second housing between said apertured walls of said second housing, said pawl elements extending between said apertured walls and having ends disposed within the apertures of said apertured walls.

8. An apparatus in claim 6 wherein at least one of said plurality of said pawl elements is movable into at least one of the spaces between the teeth of said toothed track, said pawl element being located no further from a tooth of said toothed track than the distance approximately equal to one half the cross-sectional diameter of said pawl element, irrespective of the location of said second housing with respect to said toothed track when said second housing engages said toothed track.

9. An apparatus as in claim 8 wherein said pawl elements comprise cylindrically shaped bars.

10. An apparatus as in claims 6, 7, 8 or 9 together with means for engaging and disengaging with respect to said toothed track said pawl elements within said second housing.

11. An apparatus as in claim 10 wherein the means for engaging and disengaging with respect to said toothed track said pawl elements within said second housing comprises means for pivotally mounting said second housing on said first housing and means for causing said second housing to rotate with respect to said first housing thereby moving a portion of said second housing toward or away from said toothed track.

12. An apparatus as in claim 11 wherein the means for causing said second housing to rotate with respect to said first housing comprises a hydraulically operated cylinder and piston.

* * * * *